(12) United States Patent
Matsuo et al.

(10) Patent No.: US 7,248,834 B2
(45) Date of Patent: Jul. 24, 2007

(54) COMMUNICATION APPARATUS

(75) Inventors: Takashi Matsuo, Tokyo (JP); Kunihide Fujii, Tokyo (JP); Kazuyuki Sakamoto, Chiba (JP)

(73) Assignee: Sony Corporation, Tokyo (JP)

(*) Notice: Subject to any disclaimer, the term of this patent is extended or adjusted under 35 U.S.C. 154(b) by 408 days.

(21) Appl. No.: 10/887,862

(22) Filed: Jul. 12, 2004

(65) Prior Publication Data

US 2005/0064814 A1 Mar. 24, 2005

(30) Foreign Application Priority Data

Jul. 22, 2003 (JP) ............................. 2003-277834

(51) Int. Cl.
*H04B 7/00* (2006.01)
(52) U.S. Cl. .................. 455/41.2; 455/41.1; 455/41.3; 455/575.6
(58) Field of Classification Search ............... 455/41.1, 455/41.2, 41.3, 575.6
See application file for complete search history.

(56) References Cited

U.S. PATENT DOCUMENTS

| | | | |
|---|---|---|---|
| 5,619,192 A | | 4/1997 | Ayala |
| 6,564,056 B1 * | | 5/2003 | Fitzgerald ................. 455/435.1 |
| 6,915,422 B1 * | | 7/2005 | Nakamura ................... 713/155 |
| 7,075,411 B2 * | | 7/2006 | Kelly et al. ................. 340/10.1 |
| 2002/0078363 A1 | | 6/2002 | Hill et al. |
| 2003/0028814 A1 * | | 2/2003 | Carta et al. ................. 713/202 |
| 2003/0126593 A1 * | | 7/2003 | Mault ........................... 725/10 |
| 2003/0133153 A1 * | | 7/2003 | Shinoda ..................... 358/1.15 |
| 2004/0127256 A1 * | | 7/2004 | Goldthwaite et al. ....... 455/558 |

FOREIGN PATENT DOCUMENTS

| | | |
|---|---|---|
| EP | 0 820 178 | 1/1998 |
| JP | 4-235624 | 8/1992 |
| JP | 6-50758 | 2/1994 |
| JP | 2001-117162 | 4/2001 |
| JP | 2002-215049 | 7/2002 |
| JP | 2002-269508 | 9/2002 |
| WO | WO 00/73742 | 12/2000 |

* cited by examiner

*Primary Examiner*—Matthew Anderson
*Assistant Examiner*—Tuan Pham
(74) *Attorney, Agent, or Firm*—Oblon, Spivak, McClelland, Maier & Neustadt, P.C.

(57) ABSTRACT

A portable terminal includes a near-field communication (NFC) device for performing information communication via near-field communication; a write button; and a read button. In order to write information stored in the portable terminal into an information providing apparatus, a user moves the portable terminal close to the information providing apparatus such that a distance between the portable terminal and the information providing apparatus is 10 cm or less while pressing the write button. In order to read information stored in the information providing apparatus into the portable terminal, a user moves the portable terminal close to the information providing apparatus such that a distance between the portable terminal and the information providing apparatus is 10 cm or less while pressing the read button.

7 Claims, 14 Drawing Sheets

COMMUNICATION APPARATUS

BACKGROUND OF THE INVENTION

1. Field of the Invention

The present invention relates to communication apparatuses performing near-field radio communication.

2. Description of the Related Art

Functions of portable terminals, such as cellular telephones, personal digital assistants (PDAs), and notebook computers, have been advancing, and many portable terminals have been provided with radio data communication functions. An inventor of this invention has proposed that near-field radio communication interfaces used in technologies for non-contact IC cards be used in such portable terminals in Matsuo, T. "Overview of Non-contact IC Card Technology 'FeliCa'." (in Japanese) Interface, CQ publishing Co., Ltd, (March 2003): p. 66-75. Using near-field radio communication interfaces in portable terminals provides the portable terminals with functions similar to those of non-contact IC cards. In addition, the portable terminals provided with the near-field radio communication interfaces are capable of operating as readers/writers to communicate with other apparatuses.

When portable terminals function as readers/writers, in order to communicate with other apparatuses, the portable terminals must be positioned close to the other apparatuses and some operation input must be performed, unlike IC cards. However, portable terminals, which are small, are difficult to operate. In particular, performing an operation when portable terminals are close to other apparatuses may be very inconvenient for users.

SUMMARY OF THE INVENTION

In order to solve the problems described above, it is an object of the present invention to provide a communication apparatus that is capable of data transmission by electromagnetic waves to an external apparatus and data transfer by load modulation with respect to electromagnetic waves transmitted from the external apparatus and that can read and write data by easy operation.

A communication apparatus according to the present invention capable of data transmission by electromagnetic waves to an external apparatus and data transfer by load modulation with respect to electromagnetic waves transmitted from the external apparatus includes an antenna; a receiving and demodulating unit for detecting current flowing in the antenna and for demodulating a reception signal received from the external apparatus; a modulating and transmitting unit for modulating a carrier in accordance with a transmission signal to be transmitted to the external apparatus and for transmitting the modulated carrier via the antenna; a transmission and reception control unit for controlling reception of the reception signal by the receiving and demodulating unit and transmission of the transmission signal by the modulating and transmitting unit; a storage unit for storing data; and an operation control unit for controlling an operation by a user.

The operation control unit includes a state setting part for selectively setting the communication apparatus to a transmission state and an acquisition state. When the state setting part sets the communication apparatus to the transmission state and the communication apparatus is capable of communicating with the external apparatus, the transmission and reception control unit transmits the data stored in the storage unit. When the state setting part sets the communication apparatus to the acquisition state and the communication apparatus is capable of communicating with the external apparatus, the transmission and reception control unit acquires data transmitted from the external apparatus and stores the acquired data in the storage unit.

In the communication apparatus, in order to transmit the data stored in the storage unit, the communication apparatus is set to the transmission state and is moved close to the external apparatus so as to be capable of communicating with the external apparatus. Also, in the communication apparatus, in order to acquire data transmitted from the external apparatus and to store the acquired data in the storage unit, the communication apparatus is set to the acquisition state and is moved close to the external apparatus so as to be capable of communicating with the external apparatus. Thus, writing the information into the external apparatus and reading the information from the external apparatus can be clearly switched. Also, since an input operation is not performed when the communication apparatus is close to the external apparatus, writing and reading of information can be easily performed.

The state setting part may include a first press button for setting the communication apparatus to the transmission state and a second press button for setting the communication apparatus to the acquisition state. The first press button and the second press button may be provided on the outside of a casing of the communication apparatus.

In the communication apparatus, in order to transmit the data stored in the storage unit, the communication apparatus is moved close to the external apparatus so as to be capable of communicating with the external apparatus with the first press button pressed. Also, in the communication apparatus, in order to acquire data transmitted from the external apparatus and to store the acquired data in the storage unit, the communication apparatus is moved close to the external apparatus so as to be capable of communicating with the external apparatus with the second press button pressed. Thus, writing the information into the external apparatus and reading the information from the external apparatus can be clearly switched. Also, for example, even if a user holds the communication apparatus in one hand, writing and reading can be performed.

The state setting part may include a display section on which a first software button and a second software button are displayed; and an input section for operating the first software button and the second software button. The first software button may set the communication apparatus to the transmission state. The second software button may set the communication apparatus to the acquisition state.

The state setting part may include a motion detector for detecting motion of the communication apparatus. When the communication apparatus is moved in a first direction after the communication apparatus becomes capable of communicating with the external apparatus, the communication apparatus may be set to the transmission state to transmit the data stored in the storage unit. When the communication apparatus is moved in a second direction, which is opposite to the first direction, after the communication apparatus becomes capable of communicating with the external apparatus, the communication apparatus may be set to the acquisition state to acquire the data transmitted from the external apparatus and to store the acquired data in the storage unit.

Also, a communication apparatus according to the present invention capable of data transmission by electromagnetic waves to an external apparatus and data transfer by load modulation with respect to electromagnetic waves transmitted from the external apparatus includes an antenna; a receiving and demodulating unit for detecting current flowing in the antenna and for demodulating a reception signal received from the external apparatus; a modulating and transmitting unit for modulating a carrier in accordance with a transmission signal to be transmitted to the external apparatus and for transmitting the modulated carrier via the antenna; a transmission and reception control unit for controlling reception of the reception signal by the receiving and demodulating unit and transmission of the transmission signal by the modulating and transmitting unit; a storage unit for storing data; and an operation control unit for controlling an operation by a user.

The operation control unit includes a state setting part for selectively setting the communication apparatus to a permitted state and an inhibited state. When the state setting part sets the communication apparatus to the permitted state, the transmission and reception control unit accepts a data acquisition request or a data write request from the external apparatus, and transmits the data stored in the storage unit to the external apparatus in accordance with the data acquisition request or writes data transmitted from the external apparatus into the storage unit in accordance with the data write request. When the state setting part sets the communication apparatus to the inhibited state, the transmission and reception control unit rejects the data acquisition request or the data write request from the external apparatus, and inhibits transmission of the data stored in the storage unit or inhibits writing of the data transmitted from the external apparatus into the storage unit.

DESCRIPTION OF THE PREFERRED EMBODIMENTS

A data transfer system 1 to which an embodiment of the present invention is applied will be described.

Figure 1:
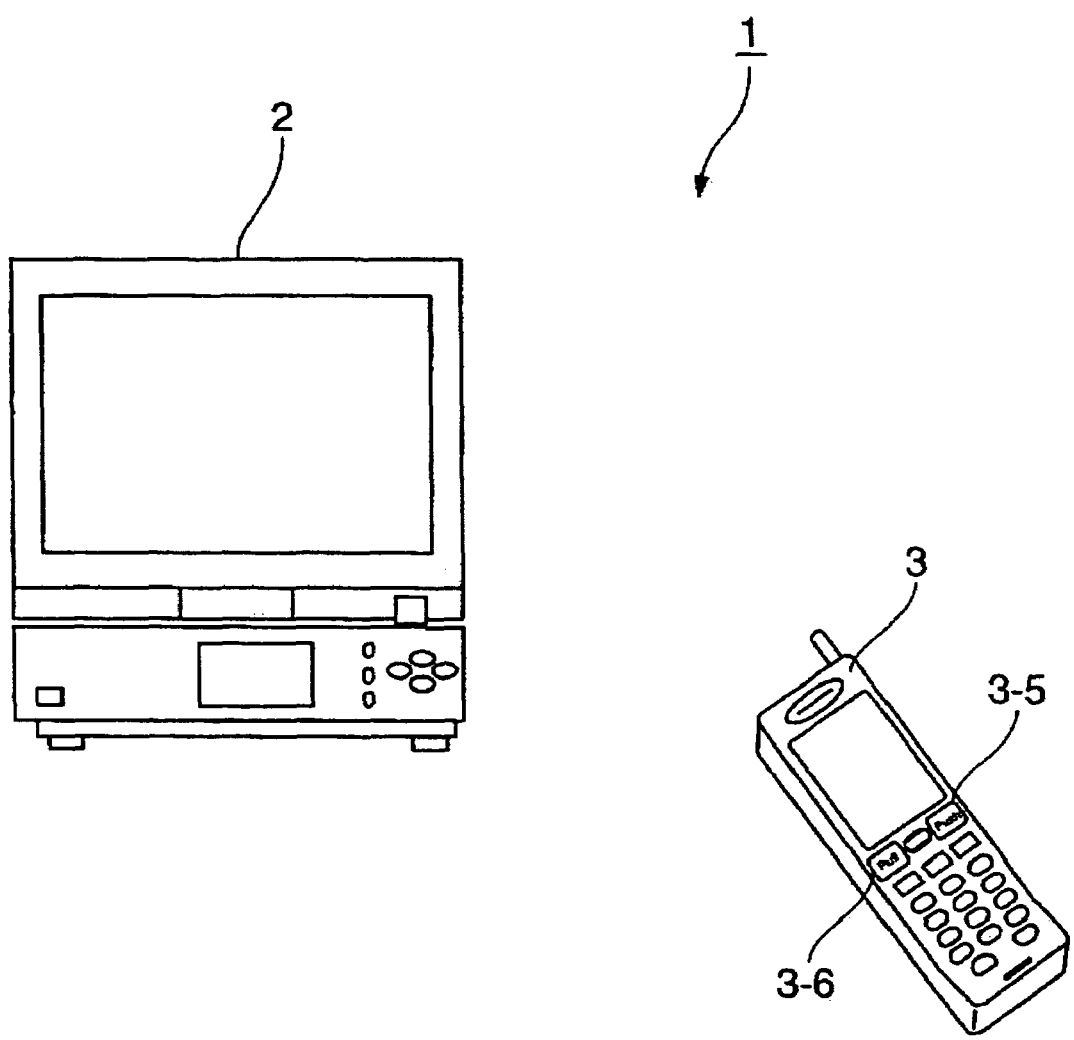
FIG. 1 is a conceptual drawing of a data transfer system to which the present invention is applied.
Figure 2:
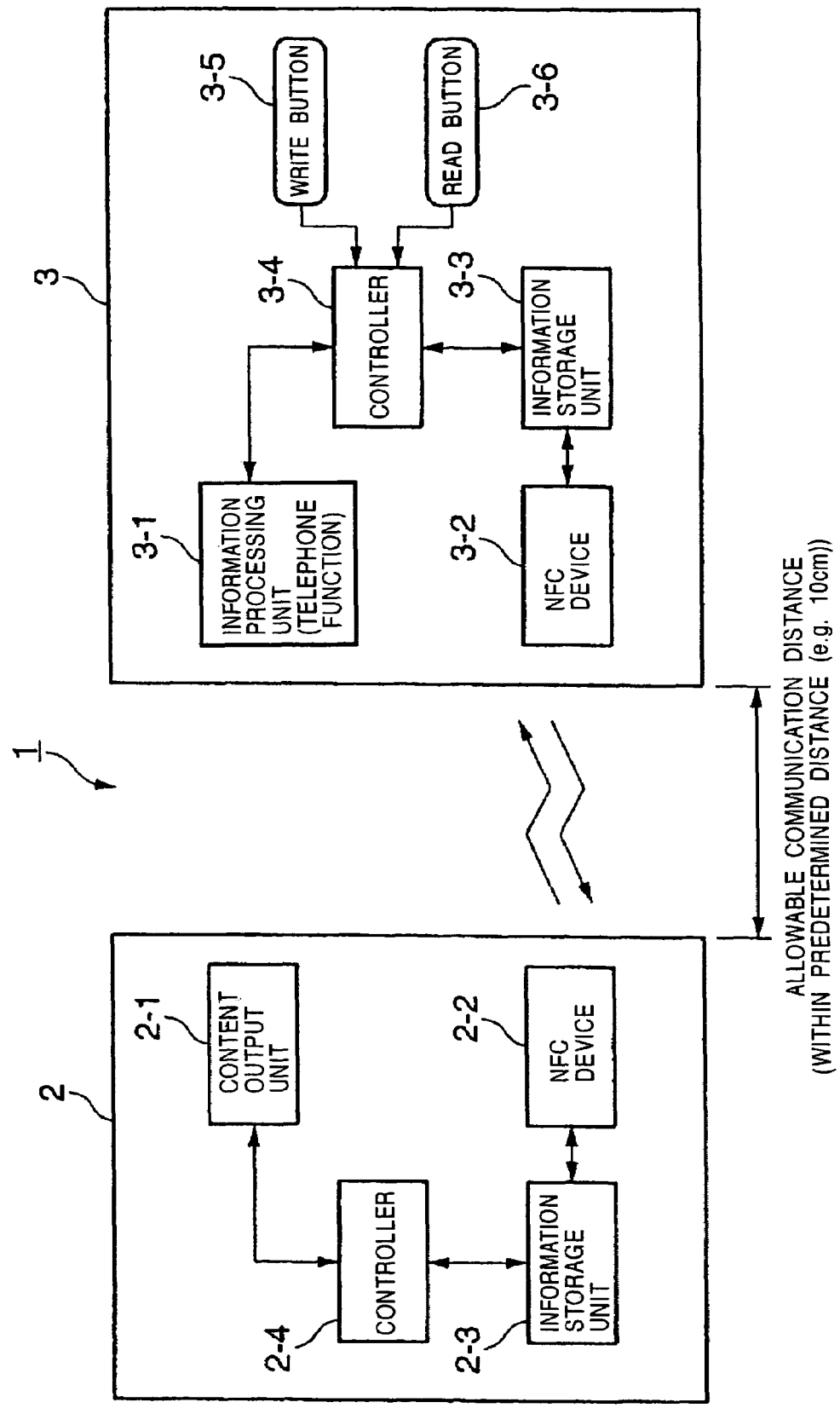
FIG. 2 is a block diagram showing the data transfer system.

FIG. 1 is a conceptual drawing of the data transfer system 1. FIG. 2 is a block diagram showing the data transfer system 1.

Referring to FIGS. 1 and 2, the data transfer system 1 includes an information providing apparatus 2, such as a television set, and a portable terminal 3, which is a portable information processing apparatus, such as a cellular telephone.

Referring to FIG. 2, the information providing apparatus 2 includes a content output unit 2-1 for outputting images, sound, and the like, a near-field communication (NFC) device 2-2 for performing NFC with other apparatuses, an information storage unit 2-3 for storing information, and a controller 2-4 for controlling these units. Also, the portable terminal 3 includes an information processing unit 3-1 serving as a main function unit, such as a telephone function unit, of the portable terminal 3, an NFC device 3-2 for performing NFC with other apparatuses, an information storage unit 3-3 for storing information, and a controller 3-4 for controlling these units. Here, NFC means radio communication in which the maximum allowable communication distance between apparatuses is a predetermined value (for example, about 10 cm). NFC will be described later.

The portable terminal 3 also has a write button (or push button) 3-5 for setting a communication state of the portable terminal 3 via the NFC to an information transmission state; and a read button (or pull button) 3-6 for setting the communication state of the portable terminal 3 via the NFC to an information reception state.

The write button 3-5 and the read button 3-6 are provided, for example, on a principal face of a casing of the portable terminal 3, as shown in FIG. 1. The write button 3-5 and the read button 3-6 are momentary pushbutton switches and are arranged such that a user can perform a press operation with his/her thumb when holding the casing in one hand. For example, the write button 3-5 and the read button 3-6 are arranged in a row at approximately the center of the face of the casing on which various other operation buttons are provided. Thus, the user can move the portable terminal 3 held in one hand to a desired place while pressing one of the write button 3-5 and the read button 3-6.

In the data transfer system 1, information can be transferred from the information storage unit 3-3 of the portable terminal 3 to the information storage unit 2-3 of the information providing apparatus 2 via the NFC. In other words, the portable terminal 3 is capable of writing the information into the information providing apparatus 2 via the NFC. Also, in the data transfer system 1, information can be transferred from the information storage unit 2-3 of the information providing apparatus 2 to the information storage unit 3-3 of the portable terminal 3 via the NFC. In other words, the portable terminal 3 is capable of reading the information from the information providing apparatus 2 via the NFC.

Figure 3:
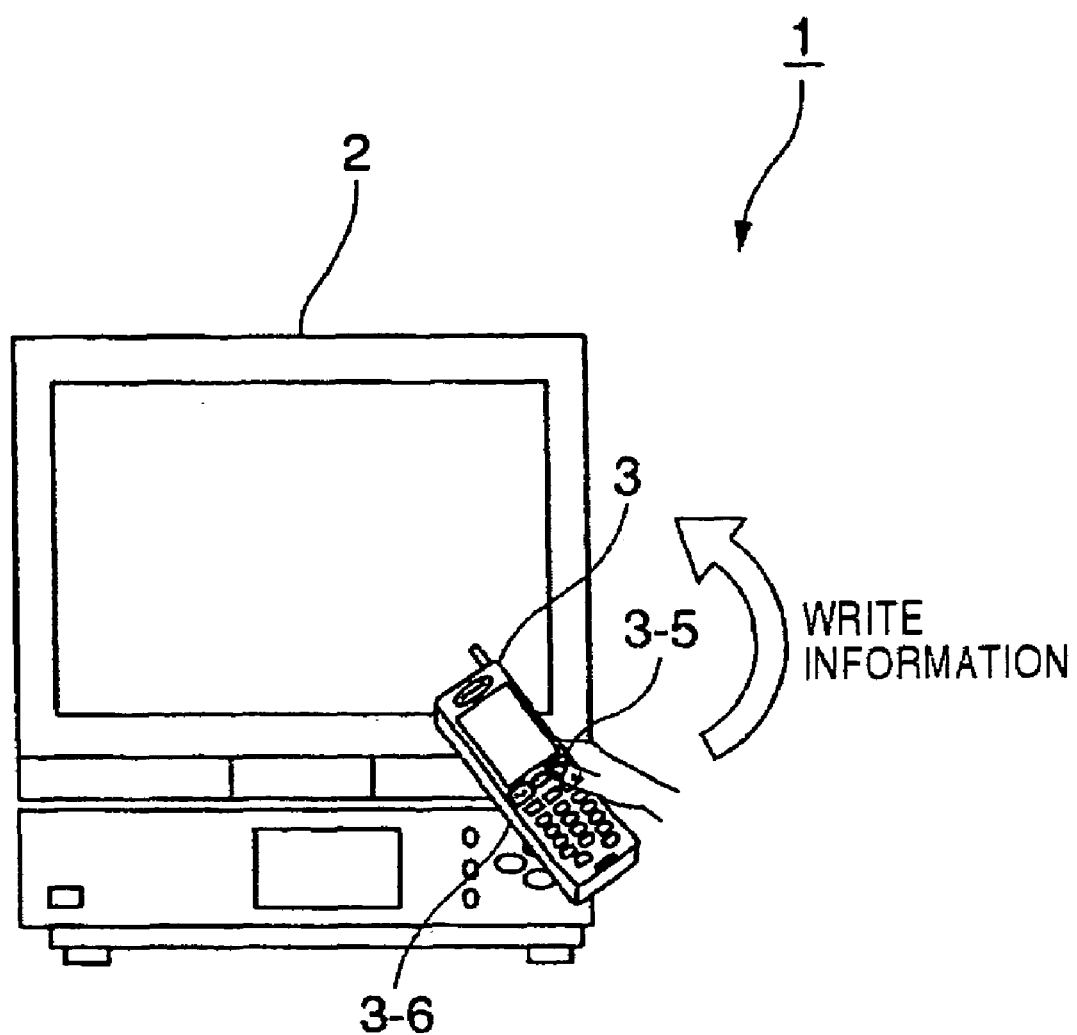
FIG. 3 explains an operation for writing data.

In order to write information stored in the portable terminal 3 into the information providing apparatus 2, a user positions the portable terminal 3 close to the information providing apparatus 2 while pressing the write button 3-5, as shown in FIG. 3. Positioning the portable terminal 3 close the information providing apparatus 2 means that positioning the portable terminal 3 to a place in which the portable terminal 3 can communicate with the information providing apparatus 2 via the NFC. The user may move the portable terminal 3 close to the information providing apparatus 2 after pressing the write button 3-5. Alternatively, the user may press the write button 3-5 after moving the portable terminal 3 close to the information providing apparatus 2.

Accordingly, necessary information is automatically transferred from the portable terminal 3 to the information providing apparatus 2. Information to be transferred may be set at the portable terminal 3 before performing the operation described above. Alternatively, information to be acquired may be set in advance at the information providing apparatus 2. If information to be acquired is set in advance at the information providing apparatus 2, only necessary information from among information stored in the information storage unit 3-3 of the portable terminal 3 is written into the information providing apparatus 2.

Figure 4:
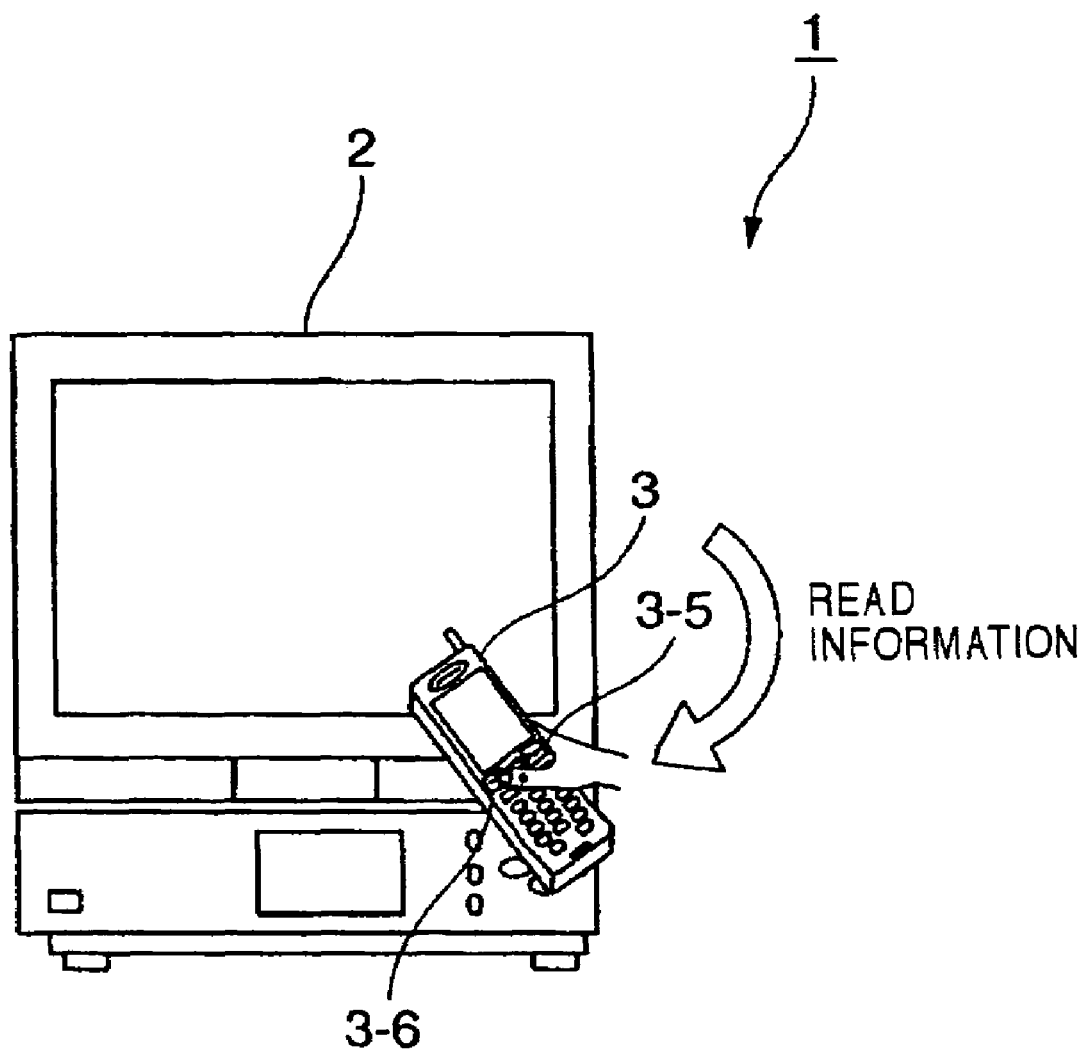
FIG. 4 explains an operation for reading data.

In order to read information stored in the information providing apparatus 2 into the portable terminal 3, a user positions the portable terminal 3 close to the information providing apparatus 2 while pressing the read button 3-6, as shown in FIG. 4. The user may move the portable terminal 3 close to the information providing apparatus 2 after pressing the read button 3-6. Alternatively, the user may press the read button 3-6 after moving the portable terminal 3 close to the information providing apparatus 2.

Accordingly, necessary information is automatically transferred from the information providing apparatus 2 to the portable terminal 3. Information to be transferred may be set at the portable terminal 3 before performing the operation described above. Alternatively, information to be transmitted may be set in advance at the information providing apparatus 2.

As described above, the portable terminal 3 is provided with a user interface, that is, the write button 3-5 for setting a communication state of the portable terminal 3 via the NFC to an information transmission state; and another user interface, that is, the read button 3-6 for setting the communication state of the portable terminal 3 via the NFC to an information reception state. Thus, since the portable terminal 3 is capable of writing or reading information immediately after the portable terminal 3 becomes close to an external communication apparatus, the information can be read or written by easy operation. In particular, since a communication state can be set by very simple operation using the write button 3-5 or the read button 3-6, inconvenience to users can be reduced.

The NFC device 2-2 and the NFC device 3-2 provided in the information providing apparatus 2 and the portable terminal 3, respectively, and NFC, which is a communication method used in the NFC device 2-2 and the NFC device 3-2, will now be described.

Figure 5:
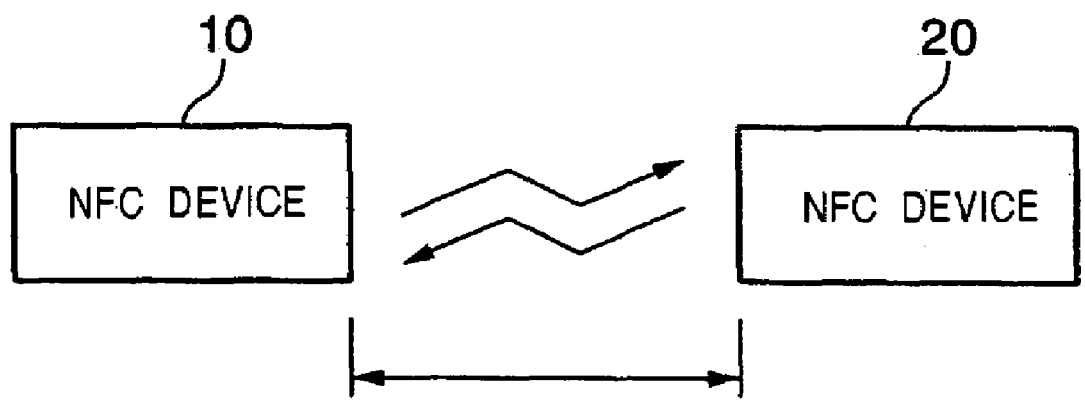
FIG. 5 shows an arrangement of an NFC system.

FIG. 5 shows an example of the structure of a communication system for NFC.

As shown in FIG. 5, NFC is bidirectional radio communication between NFC devices 10 and 20.

In NFC, as shown in FIG. 5, when a distance between the NFC devices 10 and 20 is less than or equal to the maximum allowable communication distance (for example, 10 cm or 50 cm), NFC devices 10 and 20 can communicate with each other. The allowable communication distance is a distance between two NFC devices that is achieved when a user actively tries to make the NFC devices close to each other. An allowable communication distance and an operation for actively making two NFC devices close to each other by a user are determined depending on the functions and characteristics of apparatuses installed with the NFC devices. For example, if an NFC device is installed in a portable apparatus that is small and light enough to be held by a user in one hand, the operation for actively making the NFC devices close to each other may be an operation for making the NFC devices close to each other so that a distance between the NFC devices is 10 cm or less. If NFC devices are used for communication between a card carried by a user and a security device for a security gate when the user passes through the security gate, the operation for actively making the NFC devices close to each other may be an operation for making the NFC devices close to each other so that a distance between the NFC devices is 50 cm or less.

Also, NFC is radio communication in which predetermined electromagnetic-wave carriers modulated using digital data are transmitted, the transmitted electromagnetic waves are received by an antenna, and the digital data modulated on the reception signal is demodulated. NFC may be half-duplex communication in which two devices transmit electromagnetic waves of a common frequency. Alternatively, NFC may be full-duplex communication in which two devices transmit electromagnetic waves of differing frequencies. A carrier frequency used in NFC is, for example, a 13.56 MHz industrial, scientific, and medical band.

Also, NFC is capable of data transmission in two modes: an active mode and a passive mode. In the active mode, by supplying electric power to an antenna, a transmitter transmits electromagnetic waves modulated using digital data, and a receiver receives the modulated electromagnetic waves. In the passive mode, the receiver generates a magnetic field of a predetermined frequency (magnetic field in which information is not demodulated) from its own loop antenna, and the transmitter changes a load value of its own loop antenna in accordance with digital data. The change in the load value causes current flowing in the loop antenna of the receiver to be changed, so that the transmitter transmits the digital data to the receiver. In other words, in the passive mode, data is transmitted based on load modulation. In NFC, the active mode and the passive mode use the same digital modulation and share a demodulator between them. In other words, in NFC, digital modulation capable of modulation even in the passive mode, such as amplitude shift keying (ASK), phase shift keying (PSK), or quadrature amplitude modulation (QAM), is used.

Also, in NFC, when information is transmitted in the passive mode or when information transmitted in the active mode is received, electric power supplied due to electromagnetic induction by received electromagnetic waves operates an internal electric circuit. Thus, when information is transmitted in the active mode, a sufficient amount of transmission electric power is ensured so that a sufficient amount of electric power can be supplied within the allowable communication distance described above on the assumption that a receiver does not have internal electric power.

The physical characteristics of NFC have been described above.

NFC communication may be used for various apparatuses, such as, a portable information processing apparatus, a personal computer, a large-sized computer, a cellular telephone, and a notebook computer. Since, in NFC communication, one of communication apparatuses does not have to be provided with a power supply (because transmission can be performed in a passive mode and electric power can be supplied based on received electric wave power), for example, an NFC device may be used in various objects, such as a card-type storage medium, a wall-mounted advertisement, and a hanging advertisement.

Figure 6:
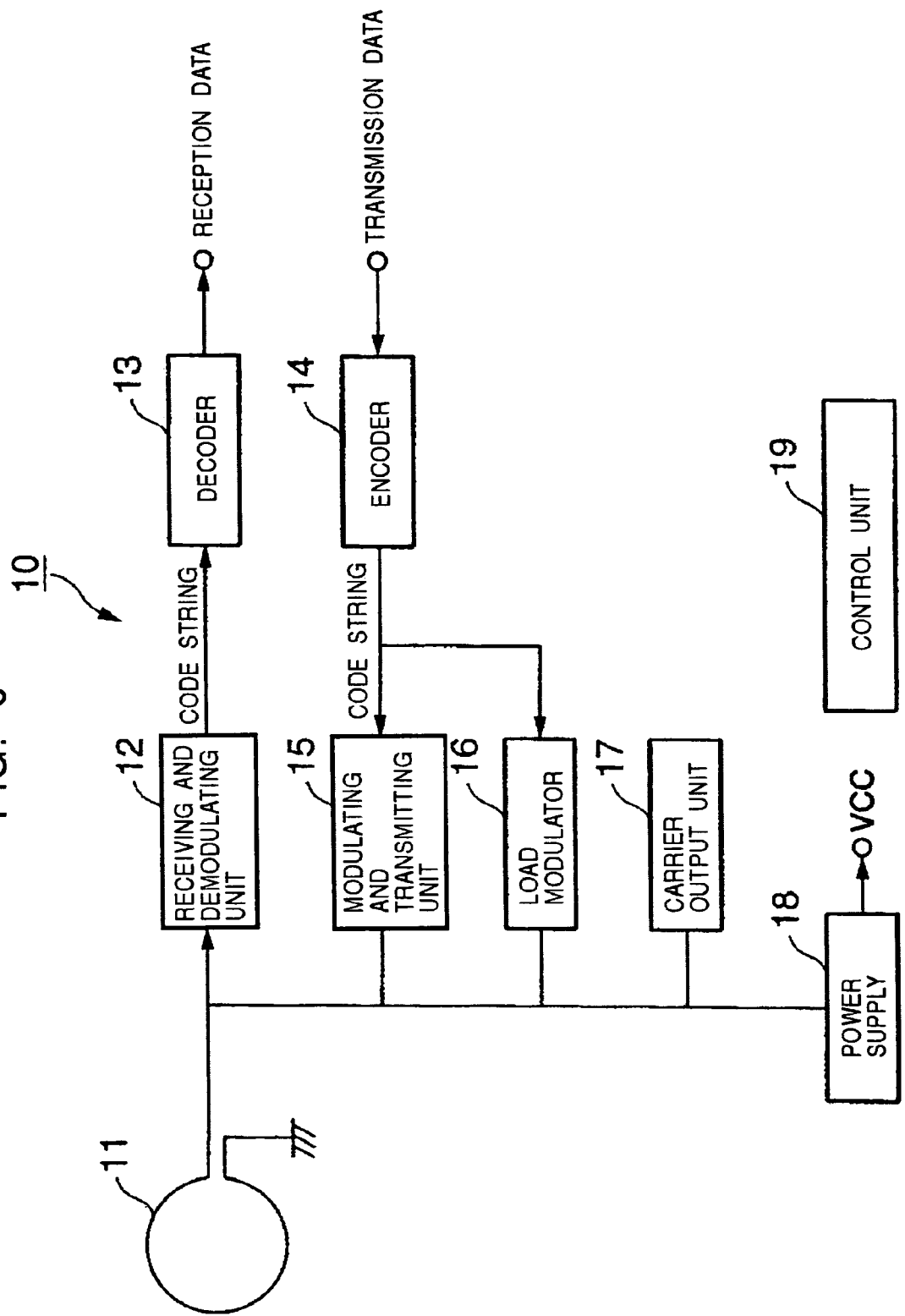
FIG. 6 is a block diagram showing an NFC device.

The structure of the NFC device 10 will now be described with reference to FIG. 6.

The NFC device 10 includes a loop antenna 11.

The loop antenna 11 is formed of a closed loop coil. A change in current flowing in the closed loop causes electromagnetic waves to be radiated from the loop antenna 11 to the outside. Also, in the loop antenna 11, due to a change in the magnetic flux density passing in the closed loop affected by a magnetic field and an externally incident electromagnetic wave, a current corresponding to the density of the electromagnetic wave and the magnetic field flows in the closed loop.

Also, the NFC device 10 includes a receiving and demodulating unit 12 for tuning and detecting current flowing in the loop antenna 11 and for demodulating a detected signal to a code string; and a decoder 13 for decoding the code string obtained by the receiving and demodulating unit 12.

The receiving and demodulating unit 12 receives the current flowing in the loop antenna 11 and tunes and detects the reception signal. The receiving and demodulating unit 12 also demodulates the tuned and detected signal in accordance with predetermined modulation (for example, ASK, PSK, or QAM) to generate the code string. The code string output from the receiving and demodulating unit 12 is supplied to the decoder 13. The decoder 13 decodes the input code string in accordance with, for example, Manchester code, modified Miller, or non-return-to-zero (NRZ), to generate reception data. The generated reception data is supplied to a data processing unit or the like of an apparatus installed with the NFC device 10.

The NFC device 10 also includes an encoder 14 for encoding input transmission data to generate a code string; a modulating and transmitting unit 15 for performing modulation and transmission in accordance with the code string; a load modulator 16 for performing load modulation in accordance with the code string; and a carrier output unit 17 for generating carrier signal electric power.

The transmission data, which is to be transmitted to an external communication apparatus, is input to the NFC device 10 from the data processing unit or the like of the apparatus installed with the NFC device 10. The encoder 14 encodes the input transmission data in accordance with Manchester code, modified Miller, or NRZ to generate a code string. The generated code string is supplied to the modulating and transmitting unit 15 and the load modulator 16.

The modulating and transmitting unit 15 modulates a carrier signal at a predetermined frequency by predetermined modulation, such as ASK, PSK, or QAM, in accordance with the input code string, and amplifies the modulated signal to current-drive the loop antenna 11. Thus, the modulating and transmitting unit 15 causes the electromagnetic waves onto which information is modulated to be radiated from the loop antenna 11 to a loop antenna of the external communication apparatus, so that the information can be transmitted to the external communication apparatus.

The load modulator 16 performs load modulation by changing the impedance of the loop antenna 11 when regarding the loop antenna 11 as a coil in accordance with the input code string. Thus, the load modulator 16 is capable of transmitting information to the external communication apparatus by changing current in the loop antenna of the external communication apparatus when a magnetic field at a predetermined frequency is generated around the loop antenna of the external communication apparatus and the loop antenna 11 is within the magnetic field.

The carrier output unit 17 amplifies a signal corresponding to a carrier at a predetermined frequency to current-drive the loop antenna 11, and electromagnetic waves at the predetermined frequency onto which information is not modulated is radiated from the loop antenna 11. Accordingly, a magnetic field at the predetermined frequency is generated around the loop antenna 11. Thus, when the loop antenna of the external communication apparatus is within the magnetic field and load modulation is performed by the external communication apparatus, current flowing in the loop antenna 11 is changed, so that the information can be received from the external communication apparatus.

The NFC device 10 also includes a power supply 18 and a control unit 19.

The power supply 18 supplies DC voltage to each of the units of the NFC device 10 and the whole apparatus installed with the NFC device 10. If electric power is supplied from a battery or the like, the power supply 18 generates a DC voltage based on the electric power. If electric power is not supplied from a buttery or the like, the power supply 18 detects electric power from the loop antenna 11 to generate a DC voltage based on the electric power. In other words, if electric power is not supplied from a buttery or the like, the power supply 18 generates a DC voltage based on electric power of electromagnetic waves radiated from an external communication apparatus.

The control unit 19 controls each of the units constituting the NFC device 10.

The NFC device 10 operates as described below during transmission and reception.

For data transmission in the active mode, transmission data is input to the NFC device 10. In the NFC device 10, after the encoder 14 encodes the input transmission data, the modulating and transmitting unit 15 drives the loop antenna 11. For the data transmission in the active mode, the encoder 14 and the modulating and transmitting unit 15 operate, but the receiving and demodulating unit 12, the decoder 13, the load modulator 16, and the carrier output unit 17 do not operate.

For data transmission in the passive mode, transmission data is input to the NFC device 10. In the NFC device 10, after the encoder 14 encodes the input transmission data, the load modulator 16 changes the impedance of the loop antenna 11. For the data transmission in the passive mode, the encoder 14 and the load modulator 16 operate, but the receiving and demodulating unit 12, the decoder 13, the modulating and transmitting unit 15, and the carrier output unit 17 do not operate.

In the NFC device 10, transmission may be performed by selectively changing between the active mode and the passive mode. Alternatively, the NFC device 10 may be arranged such that transmission operation is performed only in the active mode or only in the passive mode. If transmission operation is performed only in the active mode, since the load modulator 16 is unnecessary, a function of the load modulator 16 may always be suspended or the load modulator 16 may be omitted. If transmission operation is performed only in the passive mode, since the modulating and transmitting unit 15 and the carrier output unit 17 are unnecessary, functions of the modulating and transmitting unit 15 and the carrier output unit 17 may always be suspended or the modulating and transmitting unit 15 and the carrier output unit 17 may be omitted.

For reception of data transmitted from an external communication apparatus that is in the active mode, electromagnetic waves radiated from the external communication apparatus causes current to flow in the loop antenna 11. In the NFC device 10, the receiving and demodulating unit 12 receives and demodulates a transmitted signal in accordance with the current flowing in the loop antenna 11, and the decoder 13 decodes the demodulated signal to output reception data. For the reception of the data transmitted from the external communication apparatus that is in the active mode, the receiving and demodulating unit 12 and the decoder 13 operate, but the encoder 14, the modulating and transmitting unit 15, the load modulator 16, and the carrier output unit 17 do not operate.

For reception of data transmitted from an external communication apparatus that is in the passive mode, the carrier output unit 17 causes electromagnetic waves (magnetic field) at a predetermined frequency of a predetermined electric power to be generated from the loop antenna 11. Thus, a current corresponding to load modulation of the external communication apparatus flows in the loop antenna 11. In the NFC device 10, the receiving and demodulating unit 12 receives and demodulates a transmitted signal in accordance with the current flowing in the loop antenna 11, and the decoder 13 decodes the demodulated signal to output reception data. For the reception of the data transmitted from the external communication apparatus that is in the passive mode, the receiving and demodulating unit 12, the decoder 13, and the carrier output unit 17 operate, but the encoder 14, the modulating and transmitting unit 15, and the load modulator 16 do not operate.

The NFC device 10 may be arranged such that reception of data transmitted from an external communication apparatus that is in the active mode and reception of data transmitted from an external communication apparatus that is in the passive mode can be performed. Alternatively, the NFC device 10 may be arranged such that only data transmitted from an external communication apparatus that is in the active mode or only data transmitted from an external communication apparatus that is in the passive mode can be received. If an external communication apparatus operates only in the active mode, since the carrier output unit 17 is unnecessary, the function of the carrier output unit 17 may always be suspended or the carrier output unit 17 may be omitted.

The NFC devices described above and NFC for the NFC devices are used for the information providing apparatus 2 and the portable terminal 3.

Specific usage examples: a first usage example; a second usage example; and a third usage example, for the data transfer system 1 will now be described.

Figure 7:
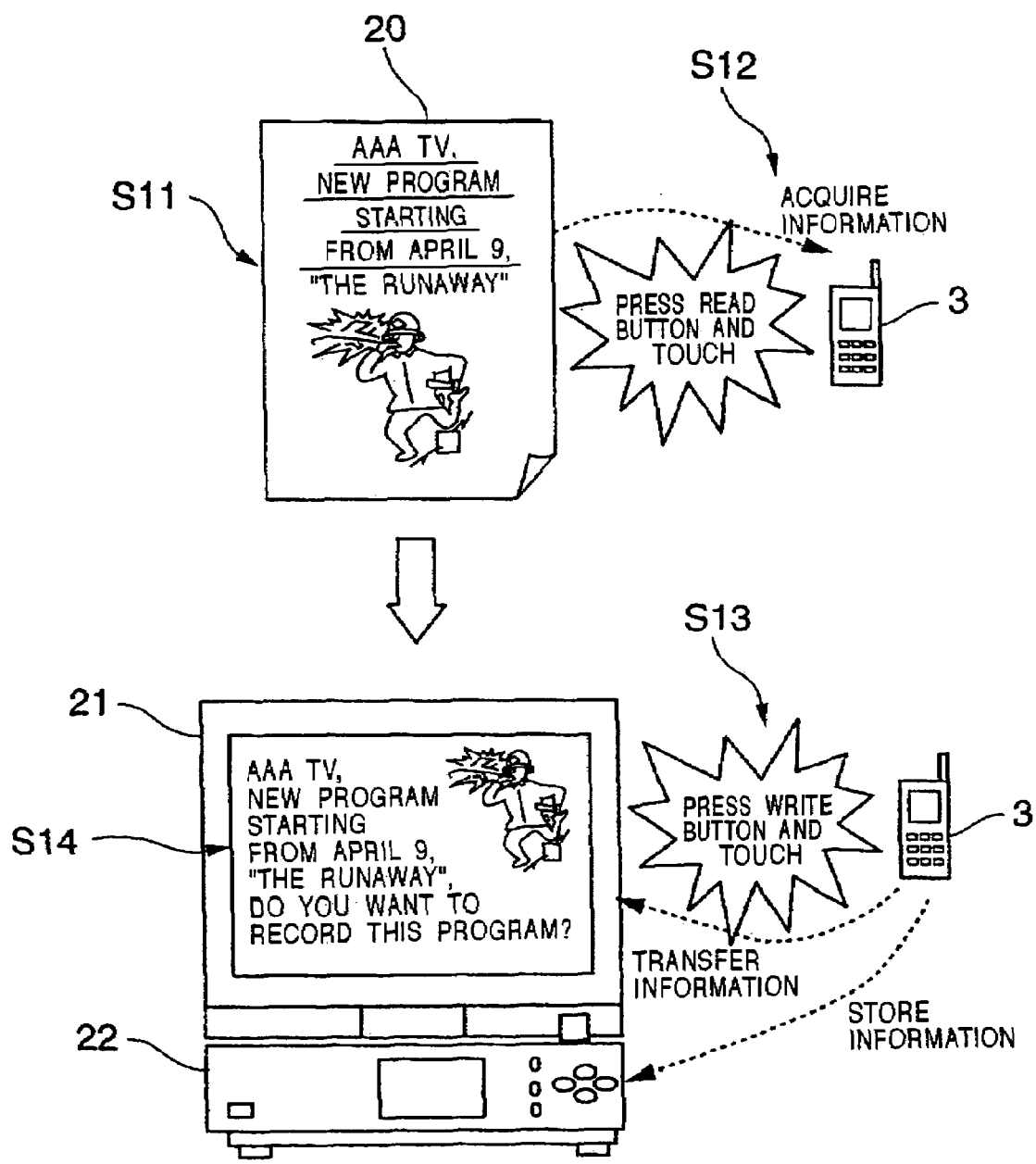
FIG. 7 explains a first usage example of the data transfer system.

FIG. 7 shows a conceptual drawing of the first usage example.

In the first usage example, the portable terminal 3 (in this case, a cellular telephone) acquires information on a television program from a promotion poster 20, and the acquired program information is reflected on a television set 21 having an NFC function.

An advertisement on the television program is prepared on the poster 20 for the street, and a memory in which an NFC device and the information on the television program are stored is provided on the poster 20 (step S11).

A user who sees the poster 20 moves the portable terminal 3 close (or touches the portable terminal 3) to the poster 20 while pressing the read button 3-6 of the portable terminal 3. Then, the program information stored in the poster 20 is transferred to the portable terminal 3 via the NFC (step S12).

Then, after going back home, the user moves the portable terminal 3 close (or touches the portable terminal 3) to the television set 21 while pressing the write button 3-5 of the portable terminal 3. This causes the program information stored in the portable terminal 3 to be transferred to the television set 21 via the NFC (step S13).

Then, the user displays the program information, for example, to make a recording reservation or to add the program to a program list including programs to be automatically recorded every week by a video server 22 (step S14).

Figure 8:
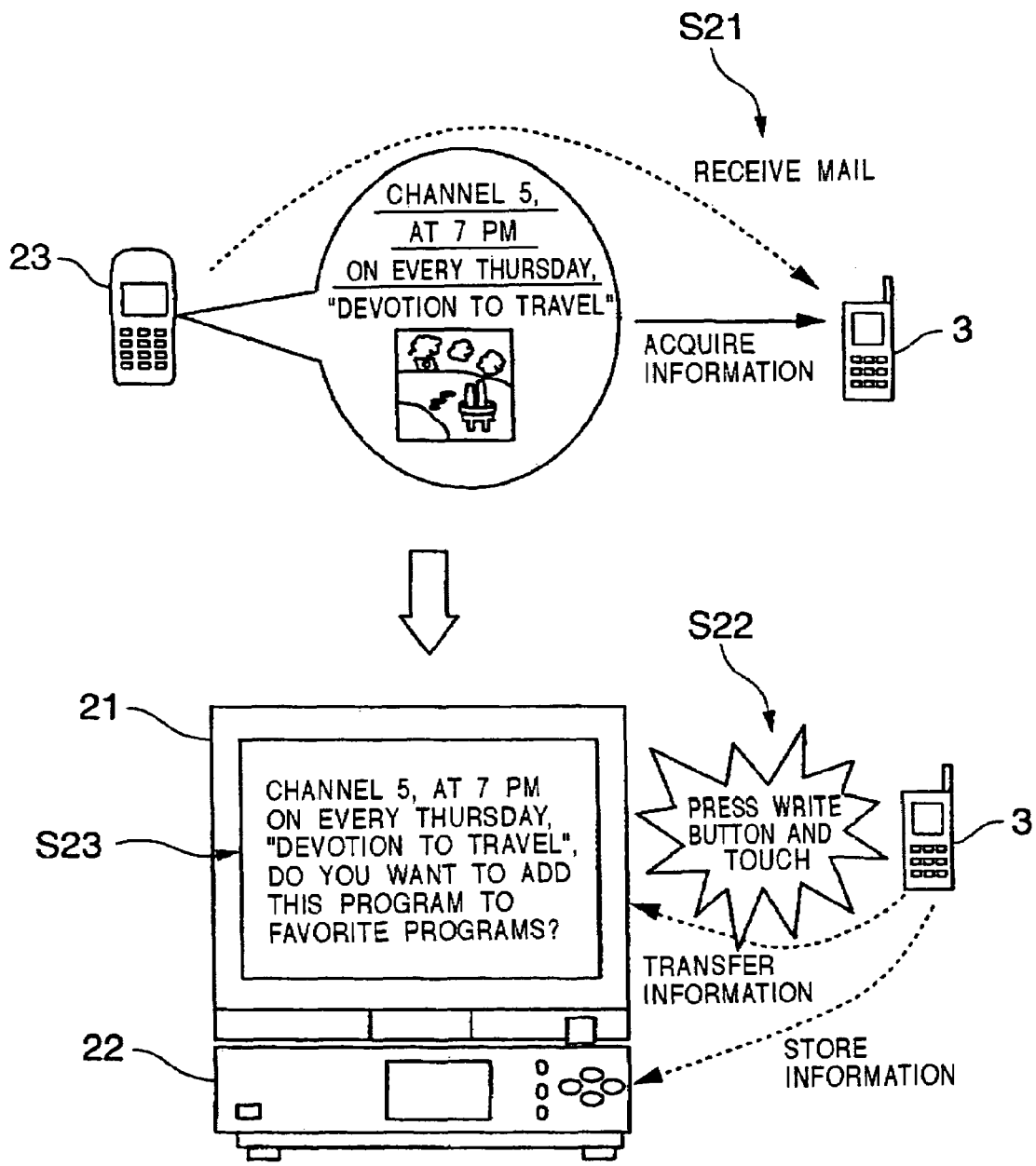
FIG. 8 explains a second usage example of the data transfer system.

FIG. 8 is a conceptual drawing of the second usage example.

In the second usage example, the portable terminal 3 (in this case, a cellular telephone) acquires information on a television program transmitted via mail from a cellular telephone 23 of a third party, and the acquired program information is reflected on the television set 21.

The information on the television program is transferred via mail from the cellular telephone 23 to the portable terminal 3, and the program information is stored in the portable terminal 3 (step S21).

A user moves the portable terminal 3 close (or touches the portable terminal 3) to the television set 21 while pressing the write button 3-5 of the portable terminal 3. Then, the program information stored in the portable terminal 3 is transferred to the television set 21 via the NFC (step S22).

Then, the user displays the program information, for example, to make a recording reservation or to add the program to a program list including programs to be automatically recorded every week by the video server 22 (step S23).

Figure 9:
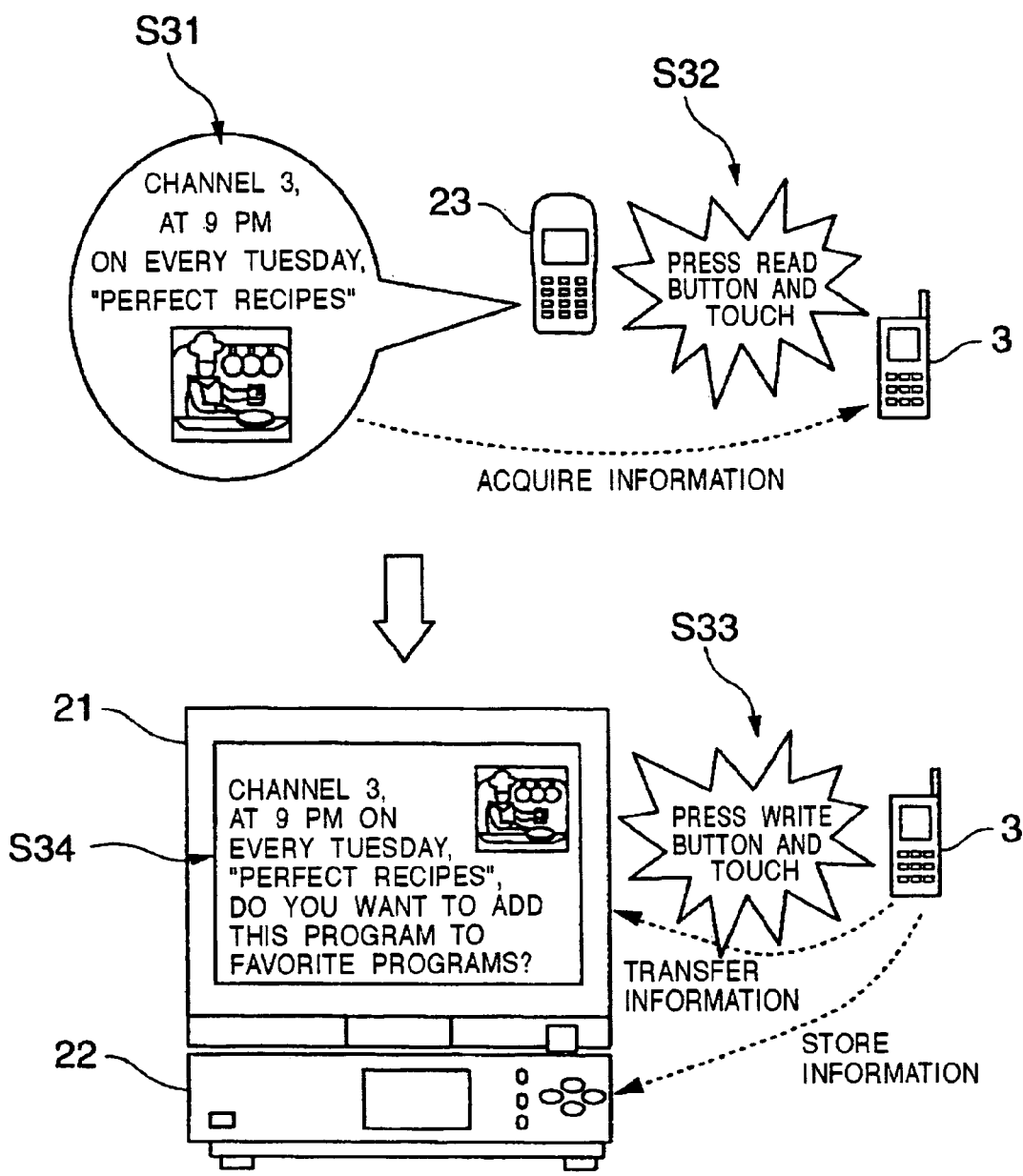
FIG. 9 explains a third usage example of the data transfer system.

FIG. 9 is a conceptual drawing of the third usage example.

In the third usage example, the portable terminal 3 (in this case, a cellular telephone) acquires information on a television program via the NFC from the cellular telephone 23 having an NFC function of a third party, and the acquired program information is reflected on the television set 21.

The information on the television program is stored in the cellular telephone 23, which has the NFC function (step S31).

A user moves the portable terminal 3 close (or touches the portable terminal 3) to the cellular telephone 23 while pressing the read button 3-6 of the portable terminal 3. This causes the program information stored in the cellular telephone 23 to be transferred to the portable terminal 3 via the NFC (step S32).

Then, after going back home, the user moves the portable terminal 3 close (or touches the portable terminal 3) to the television set 21 while pressing the write button 3-5 of the portable terminal 3. This causes the program information stored in the portable terminal 3 to be transferred to the television set 21 via the NFC (step S33).

Then, the user displays the program information, for example, to make a recording reservation or to add the program to a program list including programs to be automatically recorded every week by the video server 22 (step S34).

As described in the first to third usage examples, the data transfer system 1 is capable of writing and recording data very easily.

Modifications of the portable terminal 3 will now be described.

Although the write button 3-5 and the read button 3-6 are provided on the principal face of the casing of the portable terminal 3 in the embodiment described above, the write button 3-5 and the read button 3-6 are not necessarily limited to such physical buttons. Software buttons displayed on a display may realize the same functions as those of the write button 3-5 and the read button 3-6.

Figure 10:
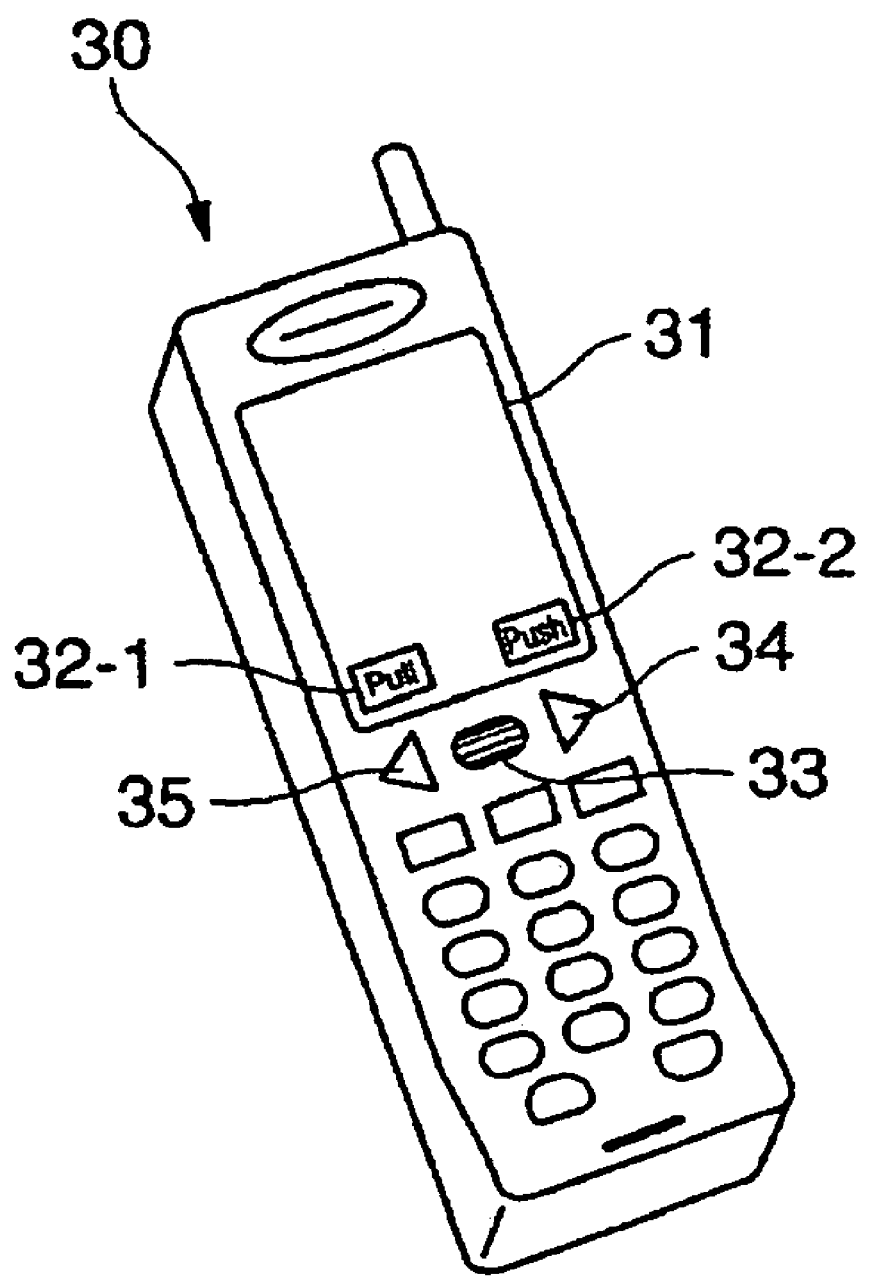
FIG. 10 shows a portable terminal provided with software buttons.

For example, in a portable terminal 30 shown in FIG. 10, a software write button 32-1 and a software read button 32-2 realize the same functions as those of the write button 3-5 and the read button 3-6 shown in FIG. 1, respectively. More specifically, for example, the software write button 32-1 and the software read button 32-2 are displayed near the lower side of a liquid crystal display 31. The portable terminal 30 is also provided with an operation input unit including a rotary pressure switch (jog dial) 33, a right shift key 34, a left shift key 35, and the like. In order to move a cursor or a highlighted area displayed on the liquid crystal display 31, such an operation input unit is operated. In the portable terminal 30, when the software write button 32-1 or the software read button 32-2 displayed on the liquid crystal display 31 is selected by moving a cursor or a highlighted area using the operation input unit, the same processing as a case where the write button 3-5 or the read button 3-6 is pressed is performed.

Also, instead of providing the write button 3-5 and the read button 3-6 shown in FIG. 1, a sensor for detecting a moving direction, such as an angular velocity sensor, may be provided so that the same functions of those of the write button 3-5 and the read button 3-6 are realized in accordance with action of a portable terminal located in the allowable communication area for the NFC.

Figure 11:
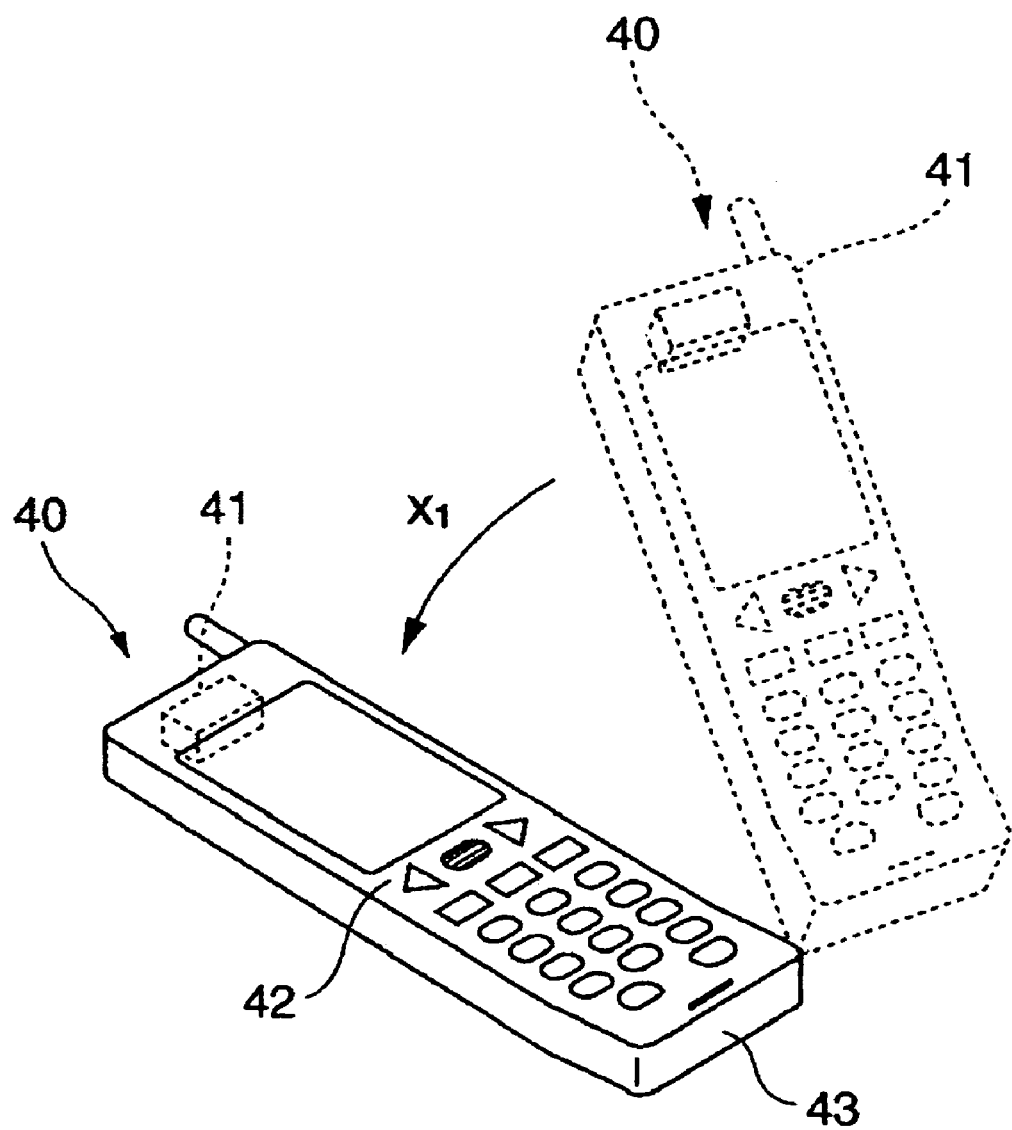
FIG. 11 explains an action of moving a portable terminal in a direction from a principal face to a rear face.
Figure 12:
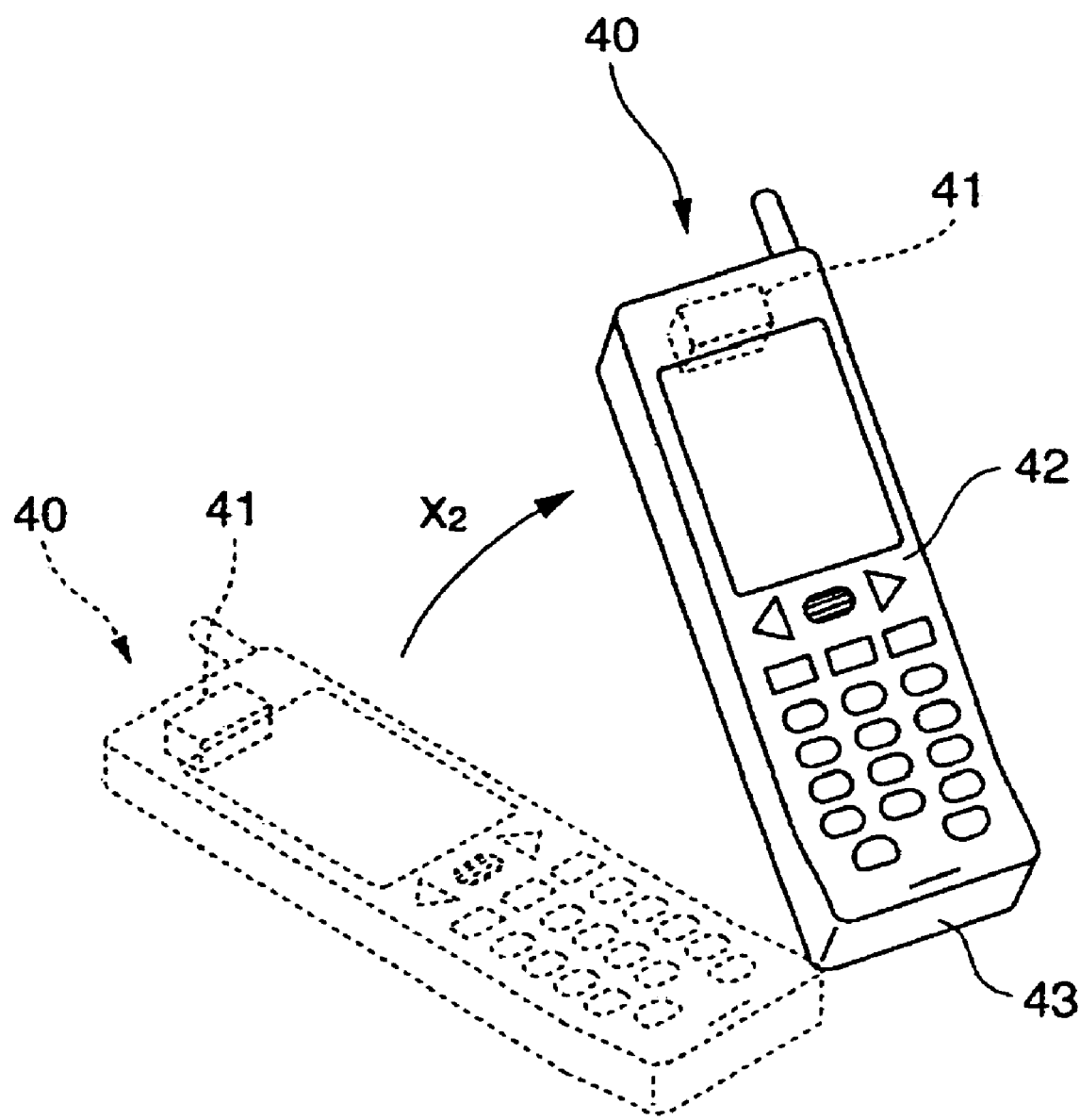
FIG. 12 explains an action of moving the portable terminal in a direction from the rear face to the principal face.

For example, in a portable terminal 40 shown in FIGS. 11 and 12, the same functions as those of the write button 3-5 and the read button 3-6 are realized in accordance with a user's action. The portable terminal 40 includes an angular velocity sensor 41 at an upper portion inside a casing of the portable terminal 40. The angular velocity sensor 41 detects whether the upper portion of the portable terminal 40 moves at a predetermined acceleration or more in an $X_1$ direction shown in FIG. 11 or at a predetermined acceleration or more in an $X_2$ direction shown in FIG. 12. The $X_1$ direction is a direction that is perpendicular to a principal face 42 on which a display part and an operation input unit are provided and that is moving from the principal face 42 to a rear face. The $X_2$ direction is a direction opposite to the $X_1$ direction. Also, the $X_1$ direction and the $X_2$ direction may be directions of rotation of the angular velocity sensor 41 around a bottom face 43.

Figure 13:
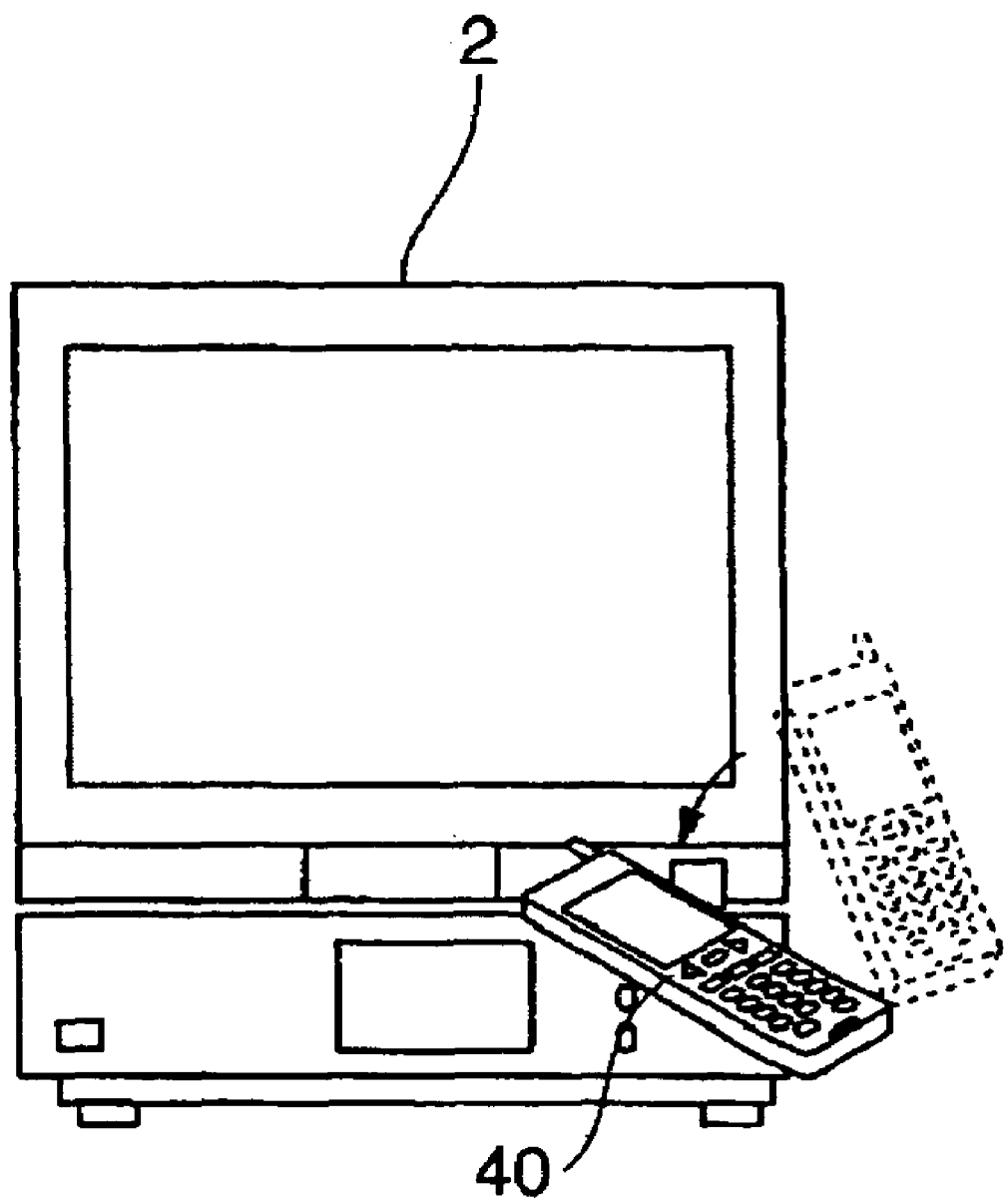
FIG. 13 shows a state in which a transmission action is performed by the portable terminal with respect to an information providing apparatus.
Figure 14:
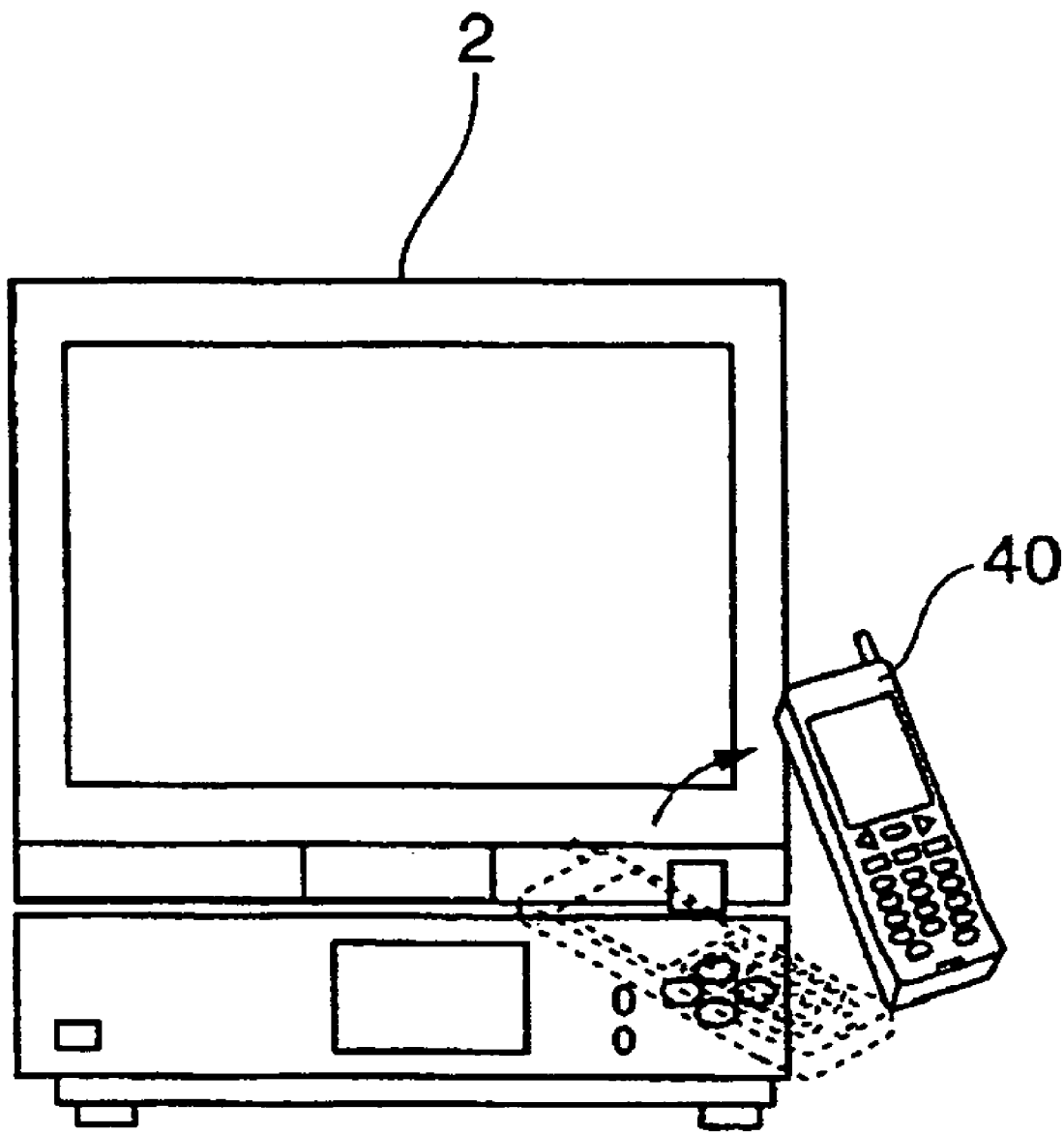
FIG. 14 shows a state in which a reception action is performed by the portable terminal with respect to the information providing apparatus.

When the portable terminal 40 is close to the information providing apparatus 2 (the distance between the portable terminal 40 and the information providing apparatus 2 is less than or equal to the allowable communication distance for the NFC) and the rear face of the casing of the portable terminal 40 faces the information providing apparatus 2, the portable terminal 40 determines whether or not an action (transmission action) of moving the casing of the portable terminal 40 closer to the information providing apparatus 2, as shown in FIG. 13, is performed on the basis of a result detected by the angular velocity sensor 41. If the transmission action is performed, the portable terminal 40 transfers data stored in the portable terminal 40 to the information providing apparatus 2. Also, when the portable terminal 40 is close to the information providing apparatus 2 (the distance between the portable terminal 40 and the information providing apparatus 2 is less than or equal to the allowable communication distance for the NFC) and the rear face of the casing of the portable terminal 40 faces the information providing apparatus 2, the portable terminal 40 determines whether or not an action (reception action) of moving the casing of the portable terminal 40 away from the information providing apparatus 2, as shown in FIG. 14, is performed on the basis of a result detected by the angular velocity sensor 41. If the reception action is performed, the portable terminal 40 receives data from the information providing apparatus 2.

Accordingly, since reading and writing of information can be performed in accordance with the user's action, easy information transfer can be realized without difficult operation.

For example, if the write button 3-5 or the read button 3-6 is accidentally pressed when the portable terminal 3 is close to the information providing apparatus 2, reading or writing of information is performed against a user's wish.

In order to avoid this, a protect function may be provided in the portable terminal 3. The protect function may be realized by providing, for example, a software switch or a physical button.

When the protect function is switched on, even if the portable terminal 3 is moved close to the information providing apparatus 2 with the write button 3-5 or the read button 3-6 pressed, a request for acquiring information from the information providing apparatus 2 or a request for writing information into the information providing apparatus 2 is rejected and transmission or reception of the information is thus inhibited. In contrast, when the protection function is switched off, if the portable terminal 3 is moved close to the information providing apparatus 2 with the write button 3-5 or the read button 3-6 pressed, the request for acquiring information from the information providing apparatus 2 or the request for writing information into the information providing apparatus 2 is accepted and transmission or reception of the information is permitted.

The protect function provided in the portable terminal 3 disables reading or writing of information against the user's wish, and this increases the security. Application of such a protect function is not necessarily limited to the portable terminal 3. Such a protect function may be used in any apparatus using the NFC device.

What is claimed is:

1. A communication apparatus for performing data transmission by electromagnetic waves to an external apparatus and data transfer by load modulation with respect to electromagnetic waves transmitted from the external apparatus, the communication apparatus comprising:

an antenna;

a receiving and demodulating unit for detecting current flowing in the antenna and configured to detect a reception signal received from the external apparatus;

a modulating and transmitting unit configured to modulate a carrier in accordance with a transmission signal to be transmitted to the external apparatus and for transmitting the modulated carrier via the antenna;

a transmission and reception control unit configured to control reception of the reception signal by the receiving and demodulating unit and transmission of the transmission signal by the modulating and transmitting unit;

a storage unit configured to store data; and an operation control unit configured to control an operation by a user, the operation control unit including a state setting part configured to selectively set the communication apparatus to a transmission state and an acquisition state, wherein:

when the state setting part sets the communication apparatus to the transmission state and the communication apparatus is capable of communicating with the external apparatus, the transmission and reception control unit transmits the data stored in the storage unit; and when the state setting part sets the communication apparatus to the acquisition state and the communication apparatus is capable of communicating with the external apparatus, the transmission and reception control unit acquires data transmitted from the external apparatus and stores the acquired data in the storage unit, the state setting part includes a motion detector for detecting motion of the communication apparatus;

when the communication apparatus is moved in a first direction after the communication apparatus becomes capable of communicating with the external apparatus, the communication apparatus is set to the transmission state to transmit the data stored in the storage unit; and when the communication apparatus is moved in a second direction, which is opposite to the first direction, after the communication apparatus becomes capable of communicating with the external apparatus, the communication apparatus is set to the acquisition state to acquire the data transmitted from the external apparatus and to store the acquired data in the storage unit.

2. The communication apparatus according to claim 1, wherein:

the state setting part includes a first button for setting the communication apparatus to the transmission state and a second button for setting the communication apparatus to the acquisition state; and the first button and the second button are provided on the outside of a casing of the communication apparatus.

3. The communication apparatus according to claim 1, wherein:

the state setting part includes a display section on which a first software button and a second software button are displayed; and an input section for operating the first software button and the second software button; and the first software button sets the communication apparatus to the transmission state and the second software button sets the communication apparatus to the acquisition state.

4. A communication apparatus capable of data transmission by electromagnetic waves to an external apparatus and data transfer by load modulation with respect to electromagnetic waves transmitted from the external apparatus, the communication apparatus comprising:

an antenna;

a receiving and demodulating unit configured to detect current flowing in the antenna and for demodulating a reception signal received from the external apparatus;

a modulating and transmitting unit configured to modulate a carrier in accordance with a transmission signal to be transmitted to the external apparatus and for transmitting the modulated carrier via the antenna;

a transmission and reception control unit configured to control reception of the reception signal by the receiving and demodulating unit and transmission of the transmission signal by the modulating and transmitting unit;

a storage unit configured to store data; and an operation control unit configured to control an operation by a user, the operation control unit including a state setting part configured to selectively set the communication apparatus to a permitted state and an inhibited state, wherein:

when the state setting part sets the communication apparatus to the permitted state, the transmission and reception control unit accepts a data acquisition request or a data write request from the external apparatus, and transmits the data stored in the storage unit to the external apparatus in accordance with the data acquisition request or writes data transmitted from the external apparatus into the storage unit in accordance with the data write request; and when the state setting part sets the communication apparatus to the inhibited state, the transmission and reception control unit rejects the data acquisition request or the data write request from the external apparatus, and inhibits transmission of the data stored in the storage unit or inhibits writing of the data transmitted from the external apparatus into the storage unit.

5. The communication apparatus according to claim 4, wherein:

the state setting part includes a first button for setting the communication apparatus to the permitted state and a second button for setting the communication apparatus to the inhibited state; and the first button and the second button are provided on the outside of a casing of the communication apparatus.

6. The communication apparatus according to claim 4, wherein:

the state setting part includes a display section on which a first software button and a second software button are displayed; and an input section for operating the first software button and the second software button; and the first software button sets the communication apparatus to the permitted state and the second software button sets the communication apparatus to the inhibited state.

7. The communication apparatus according to claim 4, wherein:

the state setting part includes a motion detector for detecting motion of the communication apparatus;

when the communication apparatus is moved in a first direction after the communication apparatus becomes capable of communicating with the external apparatus, the communication apparatus is set to the permitted state to transmit the data stored in the storage unit; and when the communication apparatus is moved in a second direction, which is opposite to the first direction, after the communication apparatus becomes capable of communicating with the external apparatus, the communication apparatus is set to the inhibited state to reject the data acquisition request or the data write request from the external apparatus.

* * * * *